May 2, 1939.                    D. W. DAVIS                    2,156,937
                                  SOLENOID
                            Filed May 16, 1938
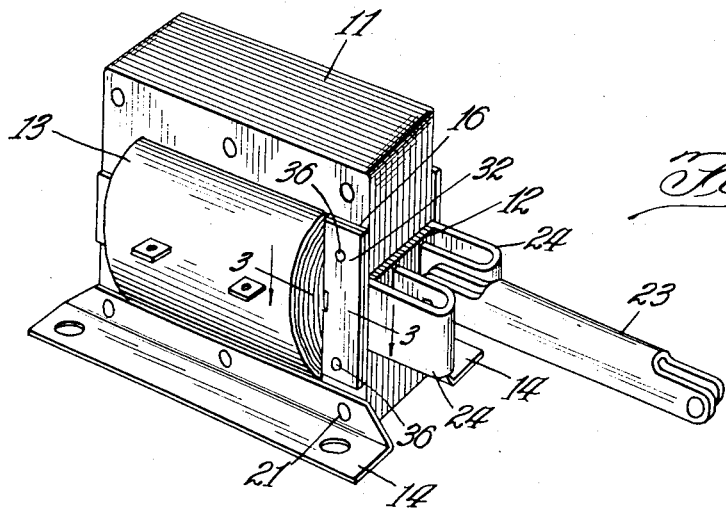
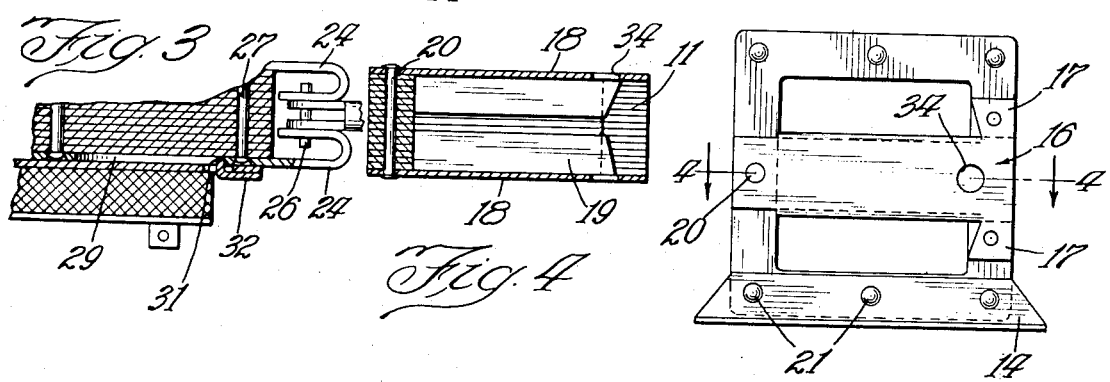
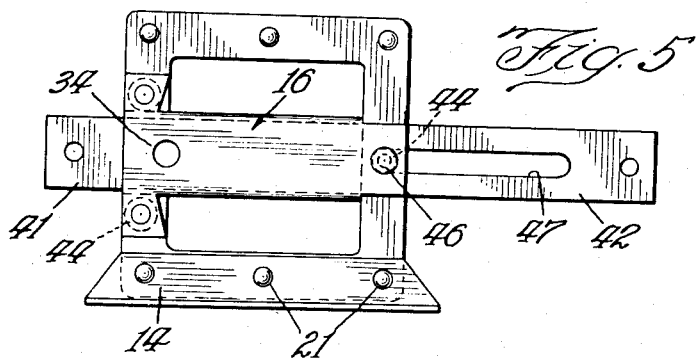
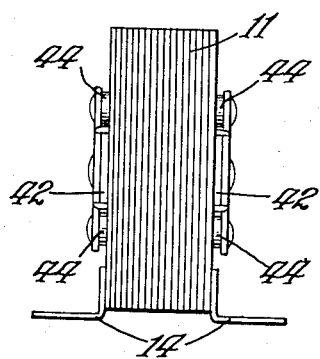
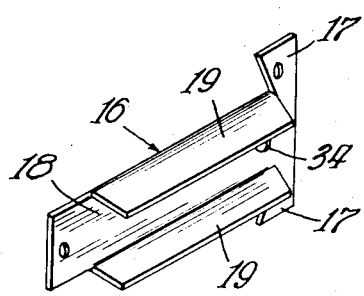
Inventor:
Dean W. Davis
By Foorman L. Mueller
Atty.

Patented May 2, 1939

2,156,937

UNITED STATES PATENT OFFICE 2,156,937

SOLENOID

Dean W. Davis, Chicago, Ill.

Application May 16, 1938, Serial No. 208,253

10 Claims. (Cl. 175—341)

This invention relates to solenoids and has been illustrated as embodied in a solenoid which is especially suitable for alternating currents.

The electrical theories and characteristics of solenoids are of course well known. Solenoids manufactured before my invention have, however, been relatively expensive, inflexible as to their uses, and sometimes unreliable from the standpoint of mechanical reliability and smoothness of operation.

One object of the present invention is to provide a construction for a solenoid which can be produced quite inexpensively and which is nevertheless thoroughly satisfactory in its operation, especially from the standpoint of mechanical reliability and smoothness.

Another object of the invention is to provide such a solenoid which is flexible as to its uses. Part of the flexibility is obtained by a construction which permits the mounting flanges to be secured at a variety of positions and part by a construction which readily adapts itself to both the push and the pull types of solenoids.

Additional objects and advantages of the invention will be apparent from the following description and from the accompanying drawing, in which:

Fig. 1 is a perspective view of the solenoid of this invention arranged to serve as a pull type solenoid.

Fig. 2 is a side view of the yoke structure with the coil and certain other parts omitted for the sake of clarity.

Fig. 3 is a fragmentary sectional view taken on the line 3—3 of Fig. 1.

Fig. 4 is a sectional view taken on the line 4—4 of Fig. 2.

Fig. 5 is a side view of the solenoid arranged as a push type solenoid with the coil omitted for the sake of clarity.

Fig. 6 is an end view of the solenoid shown in Fig. 5, the coil again being omitted.

Fig. 7 is a perspective view of the combined guide and brace plate.

Although this invention may take numerous forms, only one general form, with two adaptations, has been shown. With both adaptations the solenoid includes a stack 11 of C-shaped laminations, a stack 12 of straight laminations forming the plunger, a coil 13, and a pair of securing angle strip 14. The term "C-shaped" is not intended to mean some one exact form but rather any suitable form having the necessary opening on one side.

There is also included in both forms of the solenoid a combined brace and guide plate 16. As seen best in Fig. 7, this guide plate includes lateral extensions 17 which form the head of a T, the body portion 18 being the leg of the T. The leg of the T is provided with flanges 19. This brace and guide plate 16 is secured to the C-shaped stack of laminations as seen best in Fig. 2 with the head 17 secured across the gap of the C and the leg 18 secured by a rivet 20 to the back of the C. The flanges 19 extend in contact with the ends of the C and thereby space the plunger from the C-shaped laminations to insure its smooth operation. Furthermore, the remaining lengths of the flanges 19 guide the plunger throughout its stroke, in effect forming a smooth walled housing therefor. It should be mentioned of course that the brace and guide plates 16 are formed of a non-magnetic material such as brass or aluminum so that they will not interfere with the magnetic functions of the solenoid. In effect, the legs 18 with the flanges 19 form a housing which supports the coil 13 on the outside thereof and guides the plunger on the inside thereof.

The securing strips 14 may be secured to the solenoid along any side thereof. Each of the strips is punched with three rivet holes 21 and, as seen in Fig. 2, the top, left-hand side and bottom of the C are likewise punched with three correspondingly spaced rivet holes. Furthermore, even the right-hand end of the laminations has the two correspondingly spaced rivet holes so that the securing strips 14 could be riveted thereto, using only the two end holes in the strips 14. When the securing strips are positioned at either the front or back end of the solenoid over the plate 16, suitable bushings will be provided under the ends of the securing strips. The use of the securing strips which are independent of the means for bracing the ends of the C is very advantageous in making the solenoid adaptable to any mounting or operating position by securing the strips 14 in different positions.

There is one additional feature of adaptability which is highly desirable in the solenoid of my invention. This is that it may be readily constructed either as a push type solenoid or as a pull type solenoid. In Fig. 1 it has been illustrated as a pull type solenoid in that the plunger is drawn into the solenoid and the coupling link 23 is provided on the outer end thereof so that it will be pulled toward the solenoid as the solenoid is energized. Of course, it will usually be drawn in the opposite direction by some form of return spring associated with the controlled mechanism. The plunger of Fig. 1 has a very simple construction. The laminations 12 are secured between side plates 24 which at their outer ends are curved inwardly and doubled back as seen in Figs. 1 and 3. The doubled-back end portions are properly spaced to receive the coupling link 23 between them, this link being pivoted to them by a pin 26, as seen best in Fig. 3. The pin 26 is inserted as the side plates 24 are applied to the stack of laminations 12 and is therefore permanently secured in place by the rivets 27, which secure side plates 24 to the stack of laminations 12.

It is of course desirable to have some means for limiting the movement of the plunger so that it cannot be drawn beyond the position at which adequate force is applied thereto by the solenoid. In the adaptation of the invention shown in Figs. 1 to 4 the side plates 24 are provided with slots 29 which co-act with a lug 31 formed on a plate 32 which is secured outside of the plate 16. A hole 34 is provided in the brace and guide plate 16 to permit the passage of lug 31 therethrough. It will be understood of course that the plate 32, the head 17 of plate 16, and the ends of the C-shaped stack of laminations will all be secured together by rivets 36. Of course, lug 31 could be formed on plate 16 or it could be a plug driven into it, although the assembly would be a little less convenient.

In Figs. 5 and 6 the solenoid has been shown as adapted to be a push type of solenoid. In Fig. 5 the C-shaped laminations have been shown with their gap at the left so that, when the solenoid is actuated, the plunger is drawn toward the right. In this instance the laminations 12 of the plunger may be as thick as the C-shaped stack 11, and therefore side plates 41 will be spaced far enough apart to receive the laminations 11 therebetween. Thus, they may include extensions 42 extending past the back of the C-shaped stack 11 so that when the plunger is moved to the right in Fig. 5 the extensions 42 will exert a pushing force to such device as they are connected with. In this instance the brace and guide plate 16 will be secured in the same manner as in Fig. 2 except that spacing washers 44 will be provided between it and the laminations 11. These spacing washers for the rivets 36 are seen in Fig. 6. There would normally also be one for the rivet 46, although it is seen only in dotted lines in Fig. 5. It will be observed that the rivet 46 passes through slots 47 in the extensions 42 of side plates 41 so that this rivet 46 in cooperation with the slots 47 will serve to limit the movement of the plunger carried by the plates 41. The hole 34 therefore need not be provided in this adaptation of the invention but it will usually be provided anyway so that the same plates 16 may be used for both adaptations. It will be noted that the guide flanges 19 serve the same function as in Figs. 1 to 4, particularly in spacing the plunger from the ends of the C-shaped laminations. They also serve as guides along the path of the plunger, the rivet 46 likewise serving in this capacity in cooperating with the slots 47.

From the foregoing it is seen that a very economical solenoid construction is provided which is dependably smooth in its operation and which is highly adaptable. It may be adapted for mounting in different positions simply by securing the same securing strips to different sides of the solenoid, and it may be adapted to serve either as a push type or as a pull type solenoid by merely substituting a different plunger and using the spacing washers 44 in one instance or the movement limiting plate 32 in the other instance. In other words, the same yoke laminations, the same securing strips, and the same brace and guide plates may be used with both adaptations.

Although I have described my invention in the preferred embodiment, it is understood that the invention is not limited thereto, but changes and modifications may be made therein, all within the scope of the appended claims.

I claim:

1. A plunger for a solenoid including a magnetic core, a side plate secured on each side of the core, each side plate extending beyond the core and being curved inwardly back toward the core, and a coupling link pivoted to said side plates by a pin extending through the coupling link and through the returning portions of the side plates, said pin being retained by the outwardly extending portions of the side plates.

2. A solenoid including a C-shaped stack of laminations having a pair of rivet holes spaced alike on all four sides, a securing angle strip having correspondingly punched rivet holes therein whereby it may be secured to any of the four sides of the stack of laminations, and additional bracing means adapted to be secured to the stack on opposite sides of the opening of the C.

3. A solenoid including a C-shaped stack of laminations, a plunger operating through the opening of the C, brace means secured to the stack on opposite sides of the opening of the C, said laminations having a pair of rivet holes therein spaced alike on all four sides of the C, and a securing strip having perforations therein adapted to register with the rivet holes on any of said sides whereby in riveting the laminations together the securing strip may be secured at any of said sides.

4. A solenoid including a magnetic frame having an opening in one side thereof, a plunger operating within said frame and moving through said opening comprising a plurality of members in stacked, secured-together formation with at least one of the two outside members thereof having a recessed limiting-way therein, combined brace and guide means for said plunger comprising a body portion and a head portion having lateral extensions substantially at right angles to the body portion thereof to provide a generally T-shaped member, with said combined means extending along the path of the plunger adjacent the outside member having the recessed limiting-way and having each extension extending over a face of said frame at the opening therein, means extending through said extensions for rigidly securing said extensions to said frame, a plate secured to said frame having an integral portion bent therefrom to form a limiting projection, with said projection extending through a corresponding hole in said head portion and into said opening to coact with the limiting-way in the outside member of said plunger for limiting the movement of the plunger in said frame and with said limiting-way lying wholly within the magnetic frame when the plunger is in operated position.

5. A solenoid including a magnetic frame having an opening in one side thereof, a plunger operating within said frame and moving through the opening including a plurality of laminations in stack formation, coupling means for said plunger including a coupling plate rigidly secured on each side of said stack of laminations, said magnetic frame opening being large enough to slidably accommodate the transverse cross-sectional area of said plunger with each of said plates having a limiting-way therein and said limiting-way extending along said lamination stack and wholly between the ends of said stack of the plunger but being shorter than the length of said stack, and means for limiting the movement of said plunger including a pair of members rigidly secured to said magnetic frame on opposite faces thereof at said opening and each having a stop lug thereon extending into said opening and into said limiting-way to engage the ends of said limiting-way and limit the movement of the plunger.

6. A plunger for a solenoid including a laminated magnetic core, a side plate secured on each side of the core, each side plate having an extension extending beyond the core and being shaped at said extension out of the line of the side plate to provide a coupling-link-supporting portion, a U-shaped coupling link pivoted to said side plates at the coupling-link-supporting portions, pivot means extending through the U-shaped coupling link and through the extensions of the side plates and with each of said side plates having a limiting-way recess therein lying wholly between the longitudinal ends of the laminated magnetic core and being shorter than the longitudinal length of said laminated magnetic core.

7. A solenoid including a magnetic frame having an opening in one side thereof, a plunger operating within said frame and moving through said opening, said plunger comprising a magnetic core, a side plate secured on each side of said core, with said opening being large enough to accommodate the transverse cross-sectional area of said plunger through said core and said side plates each side plate having an extension extending beyond the core being deformed at said extension out of the line of said plate to provide a coupling link supporting portion, a coupling link pivoted to said side plates at the coupling link supporting portion, pivot means pivotally securing said coupling link to said plunger at the coupling link supporting portions, said side plates each having a limiting-way therein lying wholly between the longitudinal ends of the core with a stop shoulder at each end of said limiting-way, and means secured to said frame on opposite sides thereof at said opening including limiting means extending into said opening to coact with a corresponding limiting-way in said plunger for limiting the movement of said plunger in said frame.

8. A solenoid including a C-shaped stack of laminations having a gap on one side of said stack, a plunger operating in the gap, and a guideway for the plunger including plate means having a head secured to said stack at opposite sides of said gap, a leg bridging from the ends of the stack sides at said gap to the side of said stack opposite said gap and having an inwardly extending guide flange above and below the plunger, with said head at one portion overlying and in contact with substantially the full width of the adjacent stack lamination and restricted at another portion to permit each flange to be cut from the head and bent therefrom to a position such that in said solenoid each flange extends at one portion within said gap and intermediate the ends of the laminations and the plunger.

9. A solenoid including in combination, a movable plunger unit having a laminated magnetic core and including coupling means therewith, a magnetic laminated frame for said plunger unit having an opening at one side for movement of the plunger therethrough and being completely closed at the opposite side so that no portion of the plunger extends through said magnetic laminated frame at such opposite side, said plunger unit having a recessed limiting-way therein shorter in length than the length of said core and lying wholly within the confines of the magnetic frame when the plunger is in operated position, means secured to said magnetic frame and extending across the opening therein out of the path of movement of said plunger unit having a portion thereof extending into said opening to ride in said limiting-way to limit the movement of said plunger unit.

10. A solenoid including a magnetic unit having an opening in one side thereof and a coil in said unit, core means operating within said unit and moving through said coil and said opening, said core means including a central stack of laminations and a side plate secured on each side thereof and said side plates having cooperating coupling portions thereon, frame means extending through said coil and rigidly secured to said unit at said opening and to a side of said unit opposite said opening, said frame means including a body portion for guidably supporting said core means within said coil with each side plate adjacent said body portion, a head portion having lateral extensions rigidly secured to said unit at said opening on opposite sides thereof, and a tail portion rigidly secured to said unit at a side thereof opposite said opening, said secured head and tail portions acting to brace said unit, with one of said means having a limiting-way therein as long as the path of travel of said core means and having a stop shoulder at each end thereof and the other of said means including stop means co-acting with said limiting-way to engage the shoulders thereof to limit the movement of said core means in said solenoid, with said limiting-way lying wholly within the limits defined by the ends of the central stack of laminations when said core means is in fully operated position within said magnetic unit.

DEAN W. DAVIS.